UNITED STATES PATENT OFFICE.

CHARLES C. EGBERT, OF NIAGARA FALLS, NEW YORK.

THRUST-BEARING.

1,175,415.   Specification of Letters Patent.   Patented Mar. 14, 1916.

Application filed February 8, 1912. Serial No. 676,313.

*To all whom it may concern:*

Be it known that I, CHARLES C. EGBERT, a citizen of the United States of America, residing at Niagara Falls, in the county of Niagara and State of New York, have invented certain new and useful Improvements in Thrust-Bearings, of which the following is a full, clear, and exact description.

My invention relates generally to thrust bearings and is particularly adapted for use in connection with machinery having vertical shafts, such as, for instance, hydraulic and steam turbine driven electric generators, and its connection with vertical shafts will be so described in the following description, it being, of course, obvious that my improved thrust bearing may be used on shafts working with axis inclined any degree from the vertical.

Figure 1:
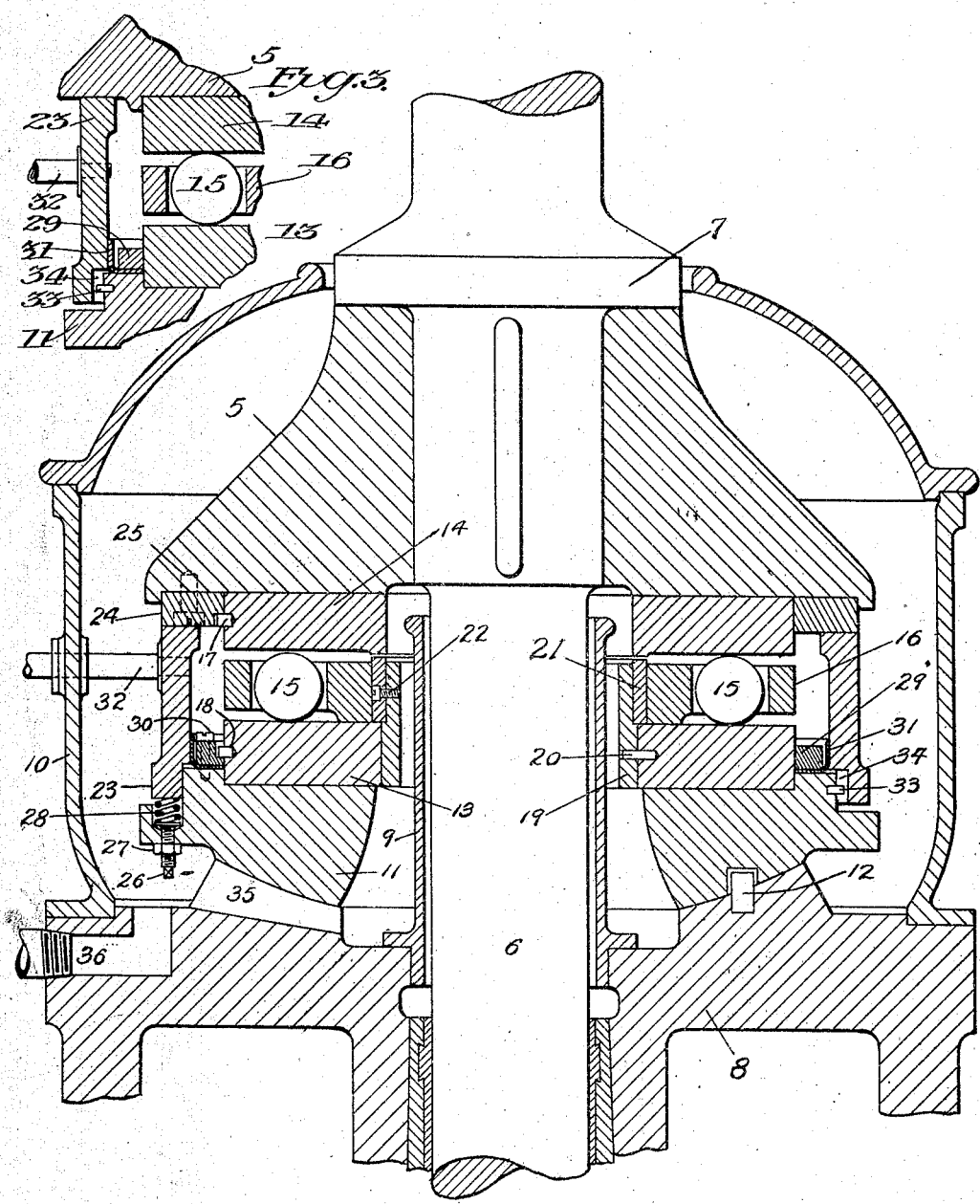
Figure 2:
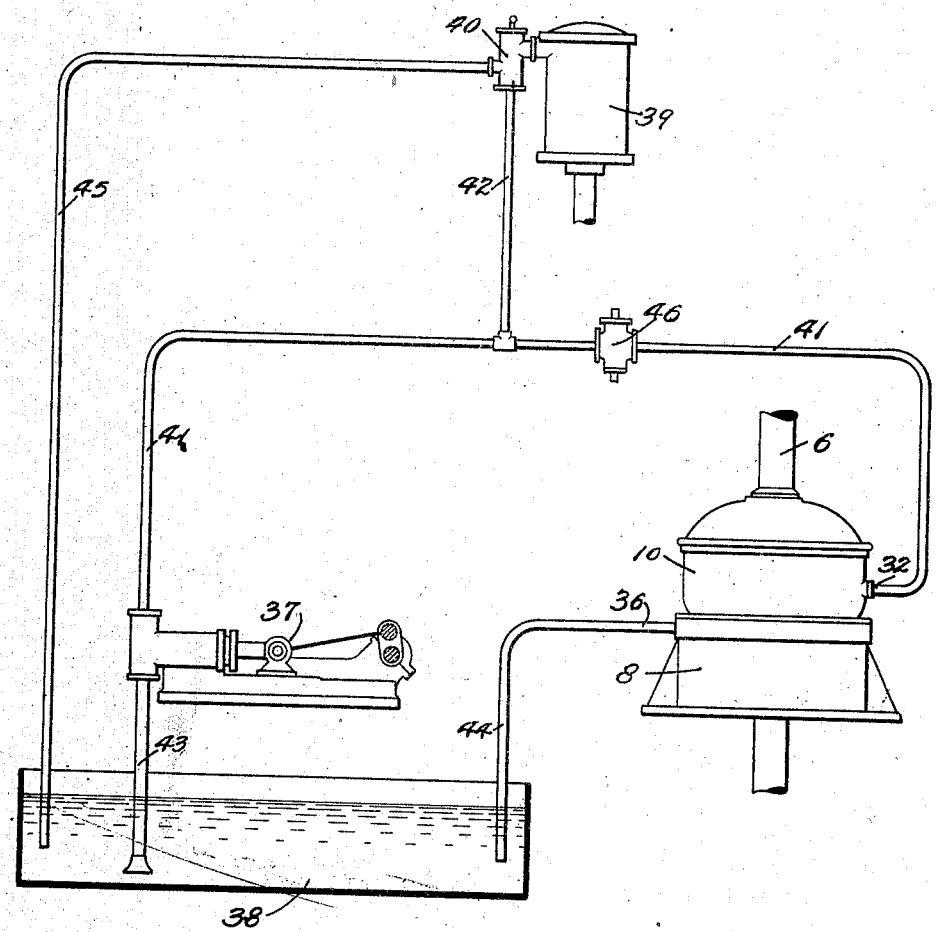

The objects of my invention are, first to provide a thrust bearing in which the revolving load may be normally carried on a cushion of fluid under pressure, but which will not fail to operate successfully should the fluid pressure be either purposely or accidentally cut off; second to provide a thrust bearing which will utilize fluid under pressure from the same system that is used to supply fluid under pressure for the operation of governors or for other purposes which may or may not require a constant supply of fluid; third, to provide a thrust bearing that will act as a relief or safety valve on the fluid supply system used in connection with it; fourth to provide a thrust bearing that will not fail to operate safely and indefinitely in spite of certain practically unpreventable inaccuracies in workmanship and changes in shape of parts after their construction; fifth to provide a thrust bearing that will safely operate with minimum amount of fluid under pressure. I attain these objects by the mechanism which is clearly set forth in the accompanying drawing, in which like characters of reference indicate like parts throughout the several views of which:

Figure 1 is a vertical section of the thrust bearing. Fig. 2 is a diagrammatical view showing my bearing connected in an oil pressure system. Fig. 3 is a fragmental section of a slightly modified form of thrust bearing.

Referring to Fig. 1 of the drawing, 5 is a thrust collar which is keyed or otherwise secured to shaft 6 so as to rotate with it. The thrust collar 5 is further secured against sliding in axial direction on the shaft by means of the shoulder 7 which is preferably made integral with the said shaft. 8 represents the base supporting the thrust bearing. The base 8 together with the sleeve 9 and the casing 10 forms an inclosure for the bearing and a receptacle for the fluid discharged as hereinafter described. 11 represents a spherically seated leveling disk, which may be secured against turning by the dowel 12. 13 and 14 represent respectively the stationary and rotating disks or races, 15 the balls and 16 the cage or separator of the ball thrust bearing. The disk 14 may be secured by one or more dowels 17 so that it will turn with the thrust collar 5, and the disk 13 may be secured by one or more dowels 18 so that it will not turn. 19 represents a shouldered ring which is secured to the inner circumference of the disk 13 either by screws or dowels 20. 21 represents the inner or retainer ring which is preferably made in halves and secured to the ring 19 by means of screws 22. The height of the ring 21 is slightly less than the diameter of the balls 15 so that it fills the space between the inner edges of the disks 13 and 14 as nearly as possible without rubbing. The ring 21 supported by the ring 19 acts as a guide to center the cage 16, and in addition serves to support the fluid pressure between the disks as hereinafter described. 23 represents the outer retainer ring which fits loosely about the outer circumference of the disk 11 and bears upward preferably against the bearing ring 24, which is secured to the thrust collar 5 preferably by means of the screws 25. This bearing ring may, if desired, be omitted and the outer retainer ring 23 may be made to bear against the lower surface of the thrust collar 5. (See Fig. 3). 26 represents one of three or more bolts which are screw-threaded into the disk 11 at points symmetrically distributed about the circumference. Each of bolts 26 is provided with a lock nut 27. Disposed between the head of each of the bolts 26 and the under surface of the ring 23 is a spring 28. To the disk 11 is secured by means of a ring 29 and screws 30, a packing ring 31 of pliable material, preferably leather, which bears against the inner surface of the ring 23. The ring 23 at the point where the packing ring 31 bears against it, is made slightly larger in diameter than the inner diameter of the surface which contacts with the bottom of ring 24 for purposes hereinafter described. 32 represents a fluid inlet pipe which passes through the casing 10 and is secured to the ring 23 in any suitable manner. The pipe 32 is made sufficiently flexible in its construction to permit a small upward and downward movement of ring 23. One or more dowels 33 are provided to secure the ring 23 against turning. The groove 34 in ring 23 into which the dowels 33 fit is proportioned to allow a small upward and downward movement of ring 23. The annular spaces at the inner and outer circumference of the thrust bearing are connected together by means of one or more passages 35. A drain 36 is provided for carrying off the fluid discharge from the bearing.

Although not shown on the drawing, all parts of the bearing encircling the shaft may be made in halves and secured together by means of bolts or they may be secured together by bolting to adjacent parts by methods well known in machine construction. Should the ring 19 be made in halves it is preferable to place the joints between its halves 180 degrees from the joints between the two halves of ring 21, so that the two rings 19 and 21 secured together by the screws 22 form a structure well able to sustain fluid pressure around it.

Referring now to Fig. 2, 10 is the casing of my thrust bearing; 8 the base thereof; 6 the vertical shaft; 32 the fluid inlet and 36 the fluid outlet or drain. 37 represents an oil pressure pump and 38 an oil reservoir. 39 is a governor, such as is used in connection with turbine water wheels and 40 the centrifugal ball-governed valve thereof. Connecting the pump 37 with the inlet 32 of the bearing is a pipe 41. Connecting the valve 40 with the pipe 41 is a pipe 42. A supply pipe 43 connects the inlet side of the pump with the reservoir 38. Extending from the outlet or drain 36 of the bearing and emptying into the reservoir 38 is a pipe 44 and connecting the outlet or drain of the governor valve 40 with the said reservoir is a pipe 45. 46 is a relief valve of any of the standard types, which is placed in the pipe 41 between the inlet 32 of the bearing and the point where the pipe 42 branches off from the pipe 41. When the governor 39 requires a maximum amount of oil for its operation, the valve 40 thereof opens up full and thus decreases the pressure of the oil in the pipe lines 41 and 42 whereupon the relief valve closes and momentarily cuts off the supply of oil to the bearing. But when the full supply of oil is partially cut off from the governor 39 the pressure of the oil in the pipe 41 will increase until it reopens the relief valve 46 when the thrust bearing will again be supplied with oil and sustained by the pressure.

Having thus described my invention, I will now describe its operation: Referring to Fig. 1 of the drawings, fluid, preferably a light lubricating oil, is admitted under pressure through the pipe 32 to the annular space confined between the disks 13 and 14, the ring 23 and the ring 21. The springs 28 force the ring 23 upward and in contact with the ring 24, so that the surface of contact between rings 23 and 24, together with the packing ring 31, prevent the escape of any appreciable amount of fluid around the outer circumference of the device. A small amount of fluid works between the surface of contact between rings 23 and 24 and serve to lubricate them. The amount of fluid between the said surfaces of contact may be increased by grooving one or both surfaces as is customary in machine construction. As hereinbefore stated, the diameter of the ring 23, where in contact with the leather packing 31, is slightly larger in diameter than the inner diameter of the surface which contacts with the bottom of the ring 24. This is done in order to counterbalance the downward effect of fluid pressure acting between the surfaces of contact of the rings 23 and 24, as for instance, when said surfaces are furnished with grooves or when there are inequalities in the same. It is desirable to have the ring 23 balanced in respect to the upward and downward pressure of the fluid, but an appreciable amount of excess of fluid pressure, either upward or downward, will not diminish the efficiency of the thrust bearing because the springs 28 may be made sufficiently strong to always force the ring upward to bear against the ring 24. The pressure of the springs 28 may be regulated by the screws 26, which when finally adjusted may be locked in place by the lock nuts 27. The pressure of the springs 28 against the ring 23 is made sufficiently great to hold the ring 23 in contact with ring 24 when there is no fluid pressure, so that the escape of fluid will be prevented when the pressure is again established. The ring 23 fits loosely enough on the outer circumference of the disk 11 so that should the pressure from the ring 24 become excessive on one side, due to wabbling of shaft caused by inaccurate workmanship or temperature changes in the various parts of the bearing or foreign matter in the fluid, the ring 23 will be free to move downwardly at point of pressure, the downward movement being opposed by the springs 28. The packing ring 31 prevents the escape of fluid between the ring 23 and the disk 11 without materially restricting the movement of the ring 23. The ring 21 acts as a guide bearing to hold the cage 16 concentric with the shaft, and in addition acts with the ring 19 to retain the fluid. The base 8, the sleeve 9 and the casing 10 form a receptacle to catch the fluid discharged from the bearing. This discharged fluid is withdrawn through groove 35 and the opening 36, and may again be raised in pressure by means of a pump and again circulated through the bearing. The ring 24 forms an easily renewable bearing surface for the ring 23, and while desirable is not a part essential to the operation of the bearing, as ring 23 may be constructed to bear directly against the thrust collar 5.

The fluid pressure in the annular space confined between the disks 13 and 14 as above set forth tends to raise the weight from the balls 15 and part or all of the revolving weight according to the amount of fluid pressure, is carried on a fluid cushion. Fluid supplied in excess of the amount required to lift the revolving weight is discharged at the inner edges of the bearing between the disk 14 and the ring 21. The device, therefore, acts in the nature of a relief valve on the source of supply. The ring 23 being free to follow the upward movement of ring 24 when the revolving parts are raised by the fluid pressure, it continues to prevent the escape of fluid at the outer circumference of the bearing, thus economizing fluid by forcing it to escape by way of the inner or shorter edge. Should the fluid supply be insufficient to lift the entire revolving weight, the portion of the weight not sustained by the fluid is carried by the ball bearing. Should the supply of fluid be shut off or reduced, either purposely or accidentally, the ball bearing will carry the revolving weight for a considerable period or momentarily until the fluid pressure is resumed.

It has heretofore been necessary in machines using a fluid pressure bearing and a fluid pressure governor to supply the same with pressure from two individual pumps. By the use of my bearing it is possible to dispense with one pump and to use a single pump for the supply of fluid to both governor and thrust bearing, as clearly shown in Fig. 2 of the drawings. By this arrangement, when fluid is momentarily used by the governor up to the full capacity of the pump, thus reducing the pressure in the bearing, the revolving load not sustained by the fluid pressure is carried by the balls as hereinbefore set forth. The relief valve 46 automatically regulates the supply of fluid to the bearing and governor as hereinbefore described.

While I have described the use of a ball bearing, obviously, a roller bearing may be used with equal advantage in place of the ball bearing. The disks 13 and 14 may, if desired, be dispensed with and the leveling disk 11 and thrust collar 5 made to form the ball races for the series of balls 15 or these disks may each be made integral with their respective parts. Other detailed modifications may be made from the device herein shown and described without departing from the spirit of my invention and I do not wish to be limited to the exact embodiment herein shown and described.

Having thus described my invention, what I claim is:

1. In a thrust bearing the combination with a rotating shaft, a thrust collar carried by and rotatable with said shaft, a rotatable bearing disk carried by said collar, a base supporting said shaft, a stationary bearing disk carried by said base and mounted opposite to said rotatable disk, a slidably mounted outer oil retainer ring disposed about said rotating and stationary disks, whereby a fluid pressure is maintained between said rotatable and stationary disks.

2. In a thrust bearing the combination with a rotating shaft, a thrust collar carried by and rotatable with said shaft, a rotatable disk carried by said collar, a base supporting said shaft, a stationary bearing disk carried by said base mounted opposite to said disk, an outer oil retainer ring disposed about said stationary and rotatable disks and an inner oil retainer ring disposed between said rotatable and stationary disks, whereby fluid pressure is maintained between said rotatable and stationary disks.

3. A thrust bearing comprising, a shaft, a stationary bearing disk, a thrust collar carried by and rotatable with said shaft, a rotatable bearing disk carried by said collar, means for maintaining a fluid pressure between said disk and an anti-friction bearing disposed between the fluid pressure areas of said disks, said stationary and rotatable bearing disks forming the raceway for said anti-friction bearing, whereby when said fluid pressure is cut off, said anti-friction bearing will carry the load.

4. In a thrust bearing, the combination of a rotating shaft, a thrust collar carried by and rotatable with said shaft, a rotatable bearing disk carried by said collar, a stationary leveling disk disposed below said collar, a stationary bearing disk carried by said leveling disk and mounted opposite to said rotatable disk, an outer oil retainer ring carried by said leveling disk and bearing against said thrust collar, and an anti-friction bearing disposed between said stationary and rotable disk and within said retainer ring, whereby a fluid pressure is maintained between said rotatable and said stationary disks.

5. In a thrust bearing, the combination of a rotating shaft, a thrust collar carried by and rotatable with said shaft, a rotatable disk carried by said collar, a stationary leveling disk disposed below said collar, a stationary disk carried by said leveling disk and mounted opposite to said rotatable disk, an outer oil retainer ring carried by said leveling disk and bearing against said thrust collar, and an inner oil retainer ring disposed between said rotatable and stationary disks, whereby a fluid pressure is maintained between said rotatable and stationary disks.

6. In a thrust bearing, the combination of a rotating shaft, a thrust collar carried by and rotatable with said shaft, a rotatable disk carried by said collar, a stationary leveling disk disposed below said collar, a stationary disk carried by said leveling disk and mounted opposite to said rotatable disk, an outer oil retainer ring carried by said leveling disk and bearing against said thrust collar, an inner oil retainer ring disposed between said rotatable and stationary disks and an anti-friction bearing disposed between said rotatable and stationary disks, whereby the load is carried by the said fluid pressure, which is maintained between said rotatable and stationary disks, and by said anti-friction bearing when said pressure is cut off.

7. In a thrust bearing, the combination of a shaft, a rotatable bearing disk carried by and rotatable with said shaft, a stationary bearing disk disposed opposite to said rotatable disk, an anti-friction bearing disposed between the fluid pressure areas of said disks, comprising a series of balls, said stationary and rotatable bearing disks forming the race-way for said anti-friction bearing, and means for normally maintaining a fluid pressure between said disks and keeping said rotatable disk slightly elevated and free from said anti-friction bearing, whereby when said fluid pressure is cut off the load is carried by said anti-friction bearing.

8. In a thrust bearing, the combination of a rotating shaft, a thrust collar carried by and rotatable with said shaft, a rotatable disk carried by said collar, a stationary leveling disk disposed below said collar, a stationary disk carried by said leveling disk and mounted opposite to said rotatable disk, an outer oil retainer ring carried by said leveling disk, a shouldered ring disposed at the inner circumference of said stationary disk, an inner oil retainer ring disposed between said rotatable and stationary disks and carried by said shouldered ring and an anti-friction bearing disposed between said rotatable and stationary disks, whereby a fluid pressure is maintained between said rotatable and stationary disks.

9. In a thrust bearing, the combination of a rotating shaft, a thrust collar carried by and rotatable with said shaft, a rotatable disk carried by said collar, a stationary leveling disk disposed below said collar, a stationary disk carried by said leveling disk and mounted opposite to said rotatable disk, an outer oil retainer ring slidably carried by said leveling disk and packing means disposed between said leveling disk and said retainer ring, whereby a fluid pressure is maintained between said rotatable and stationary disks.

10. In a thrust bearing, the combination of a rotating shaft, a thrust collar carried by and rotatable with said shaft, a rotatable disk carried by said collar, a stationary leveling disk disposed below said collar, a stationary disk carried by said leveling disk and mounted opposite to said rotatable disk, an outer oil retainer ring slidably carried by said leveling disk, packing means disposed between said leveling disk and said retainer ring and adjustable tension means disposed beneath said retainer ring, whereby a fluid pressure is maintained between said rotatable and said stationary disks.

11. In a thrust bearing, the combination of a rotating shaft, a thrust collar carried by and rotatable with said shaft, a rotatable disk carried by said collar, a stationary leveling disk disposed below said collar, a stationary disk carried by said leveling disk and mounted opposite to said rotatable disk, an outer oil retainer ring slidably carried by said leveling disk, packing means disposed between said leveling disk and said outer retainer ring, an inner retainer ring disposed between said rotatable and stationary disks and an anti-friction bearing disposed between said rotatable and stationary disks, whereby the load is carried by the fluid pressure which is maintained between said rotatable and stationary disks, and by said anti-friction bearing, when said fluid pressure is cut off.

12. In a thrust bearing, the combination with a shaft, a base supporting said shaft, a casing and a fluid inlet and outlet; of a thrust collar carried by and rotatable with said shaft, a leveling disk carried by said base, a rotatable disk carried by said collar, a stationary disk carried by said leveling disk, an outer oil retainer ring carried by said leveling disk and bearing against said thrust collar, an inner oil retainer ring disposed between said rotatable and stationary disks, an anti-friction bearing disposed between said rotatable and stationary disks and means for conducting fluid under pressure to said outer retainer ring and between said stationary and rotatable disks.

13. In a thrust bearing, the combination with a shaft, a base supporting said shaft, a casing and a fluid inlet and outlet; of a thrust collar carried by and rotatable with said shaft, a leveling disk carried by said base, a rotatable disk carried by said collar, a stationary disk carried by said leveling disk, a series of balls disposed between said rotatable and stationary disks, an outer oil retainer ring carried by said leveling disk and bearing against said collar, adjustable tension means disposed beneath said outer retainer ring, means for conveying fluid under pressure to said outer retainer ring, and between said rotatable and stationary disks, an inner oil retainer ring disposed between said rotatable and stationary disks, said inner retainer ring being slightly less in height than the diameter of said balls, whereby the shaft is normally supported by the fluid under pressure, the excess fluid being carried off by the space between said rotatable disk and said inner oil retainer ring.

14. In a thrust bearing, the combination with a shaft, a base supporting said shaft, a casing and a fluid inlet and outlet; of a thrust collar carried by and rotatable with said shaft, a leveling disk carried by said base, an outer oil retainer ring carried by said leveling disk and bearing against said thrust collar, an inner oil retainer ring disposed between said rotatable and stationary disks, a sleeve surrounding said shaft and carried by said leveling disk, said sleeve extending upwardly to substantially the center of said rotatable disk, an anti-friction bearing disposed between said rotatable and stationary disks and means for conducting fluid under pressure to said outer retainer ring and between said rotatable and stationary disks.

15. In a thrust bearing, the combination with a shaft, a base supporting said shaft, a casing and a fluid inlet and outlet; of a thrust collar carried by and rotatable with said shaft, a leveling disk carried by said base, a rotatable disk carried by said collar, a stationary disk carried by said leveling disk, a series of balls disposed between said rotatable and stationary disks, an inner oil retainer ring disposed between said rotatable and stationary disks, an outer oil retainer ring slidably carried by said leveling disk and bearing against said collar, said outer ring being provided at its upper end with an inwardly projecting shoulder and means for conveying fluid under pressure to said said outer ring and between said rotatable and stationary disks, whereby the said outer ring is balanced and the fluid under pressure prevented from escaping between said outer ring and said collar.

In testimony whereof, I hereunto signed my name in the presence of two subscribing witnesses.

CHARLES C. EGBERT.

Witnesses:
J. WM. ELLIS,
WALTER H. KELLEY.